3,431,275
3a,6a-DIAZAPENTALENES AND METHOD OF PREPARING THE SAME

Swiatoslaw Trofimenko, Philadelphia, Pa., assignor to E. I. du Pont de Nemours and Company, Wilmington, Del., a corporation of Delaware
No Drawing. Filed Mar. 8, 1965, Ser. No. 438,092
U.S. Cl. 260—310    7 Claims
Int. Cl. C07d 49/26, 49/18

ABSTRACT OF THE DISCLOSURE 3a,6a-diazapentalenes can be made by reacting a pyrazole compound with an allyl halide, halogenating, heating to cyclize the resulting halogen compound, and treating the product with a base.

The 3a,6a-diazapentalenes can be used to detect oxygen by this reaction to form colored compounds. Dicyanovinyl and tricyanovinyl substituted 3a,6a-diazapentalenes are dyes of high tinctorial strength.

---

This invention relates to a new class of organic nitrogen compounds and methods for their preparation. More particularly, it relates to 3a,6a-diazapentalenes and their preparation.

The 3a,6a-diazapentalenes of this invention have the formula (I)

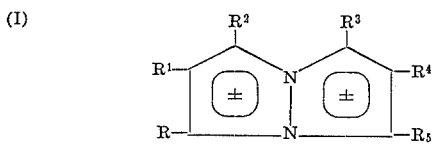

where R is hydrogen, halogen, alkyl, alkoxy, formyl (—CHO), cyano, dicyanovinyl or tricyanovinyl; $R^1$ is hydrogen, halogen or alkyl; $R^2$ is hydrogen, halogen, alkyl, cyano, dicyanovinyl, or tricyanovinyl; $R^3$ is hydrogen, alkyl, cyano, dicyanovinyl, or tricyanovinyl; $R^4$ is hydrogen, halogen or alkyl; $R^5$ is hydrogen, alkyl, haloalkyl, cyano, dicyanovinyl or tricyanovinyl; with the proviso that the groups cyano, dicyanovinyl, or tricyanovinyl can be substituted only on one of the two rings. That is, if one or both of R and $R^2$ is cyano, dicyanovinyl or tricyanovinyl, then $R^3$ or $R^5$ cannot be one of those groups; and vice versa.

The alkyl, alkoxy, and haloalkyl groups are not critical in the length of the carbon chain; however, for convenience they will usually contain 1–6 carbon atoms. The halogen is preferably chlorine, bromine or iodine. The circles inscribed within the rings indicate resonance-stabilized structures and the charges depicted therein indicate a mesoionic structure of reversible charges, i.e., the system is in resonance. It is to be understood that the groups R through $R^5$ may be the same or different, and that the definition carries a proviso that a maximum of two of either of the groups R and $R^2$ or $R^3$ and $R^5$ may be cyano, dicyanovinyl, or tricyanovinyl.

The compounds of the invention are high-melting crystalline solids. In general they react with oxygen to give dark colored products; and because of the resonance-stabilized mesoionic structure, have aromatic properties.

Compounds of the invention having the formula (II)

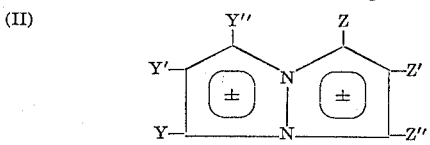

wherein Y is hydrogen, halogen, alkyl, alkoxy or formyl; Y', Y" and Z' individually are hydrogen, halogen or alkyl; Z is hydrogen or alkyl; and Z" is hydrogen, alkyl or haloalkyl; can be prepared by reacting in the presence of a base, a compound of the formula (III)

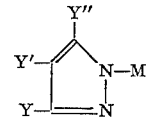

wherein M is hydrogen; alkali metal, such as sodium, potassium or cesium, or a tertiary or quaternary ammonium group, i.e., a group of the formula $R_3NH^+$ of $R_4N^+$ where R is hydrocarbyl; and preferably is alkyl of 1–6 carbon atoms; with an allyl halide of the formula (IV)

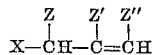

where X is a halogen, preferably chlorine or bromine; followed by halogenation and quaternization (ordinarily in one step), and dehydrohalogenation with a strong base.

The steps of the reaction sequence are represented by the following equations:

Step 1

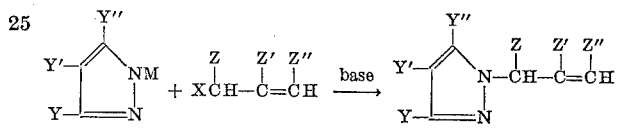

Step 2

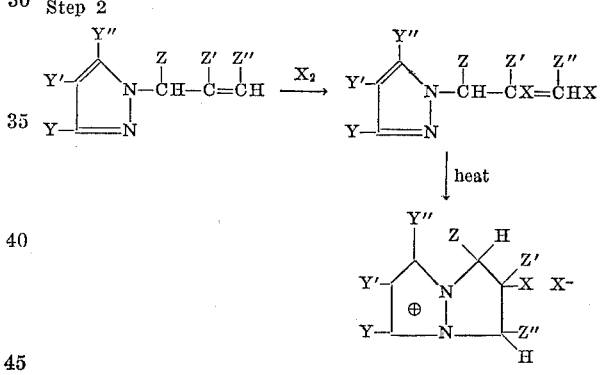

Step 3

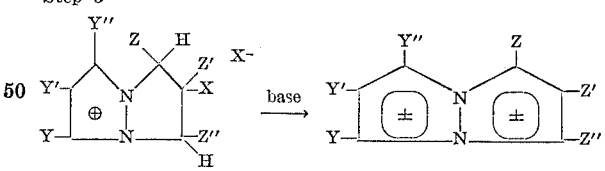

By employing the appropriate pyrazole and allyl halide reactants, the compounds of Formula II are obtained.

Such compounds are exemplified by:

3a,6a-diazapentalene
2-bromo-3a,6a-diazapentalene
1,3-dimethyl-3a,6a-diazapentalene
1,3-dimethyl-2-bromo-3a,6a-diazapentalene
1,2,3-trimethyl-3a,6a-diazapentalene
1,3-dicyano-3a,6a-diazapentalene
1,3-dimethyl-2-bromo-3a,6a-diazapentalene-4,6-dicarbonitrile
1,3-dihexyl-5-iodo-3a,6a-diazapentalene
1-chloro-3-propyl-3a,6a-diazapentalene
1-methoxy-3-iodo-3a,6a-diazapentalene
1-propoxy-4-hexyl-3a,6a-diazapentalene
1-formyl-5-methyl-3a,6a-diazapentalene
2-phenyl-4-methyl-6-hexyl-3a,6a-diazapentalene
2-chloro-5-ethyl-6-chloroethyl-3a,6a-diazapentalene 2-pentyl-3-chloro-6-bromopentyl-3a,6a-diazapentalene
5-chloro-6-ethyl-3a,6a-diazapentalene
1,3-bis(dicyanovinyl)-4,6-dimethyl-3a,6a-diazapentalene
1-methyl-4,6-bis(tricyanovinyl)-3a,6a-diazapentalene
1,2,3-trimethyl-4,6-bis(dicyanovinyl)-3a,6a-diazapentalene
1,3-bis(tricyanovinyl)-3a,6a-diazapentalene
1,3-dicyano-3a,6a-diazapentalene, and the like.

STEP 1

This step is carried out by mixing the pyrazole compound and the allyl halide in a basic medium. Any amount of the two reactants may be employed; however, it is preferable to use equimolar amounts to obtain maximization of yield.

A polar inert solvent is preferably employed, but is not critical to the reaction. Suitable solvents include ethers, such as dioxane, 1,2-dimethoxyethane, tetrahydrofuran, and the like, and alcohols, such as ethanol.

The purpose of the base is to facilitate formation of the pyrazolide ion, which reacts with the allyl halide. Thus, employable bases include hindered tertiary aliphatic amines, i.e., tertiary aliphatic amines having at least two carbon atoms in each aliphatic group. Preferably these amines will be trialkyl- or alkylcycloalkylamines such as diisopropylethylamine, dicyclohexylethylamine, tri-n-hexylamine, and the like. For convenience the amines usually will have from 2–8 carbon atoms in each aliphatic group. Other bases which may be employed include alkali metal or quaternary ammonium hydroxides or alkoxides, as for example, tetramethyl ammonium hydroxide, sodium hydroxide, sodium methoxide, and the like. The quaternary ammonium cation can be any tetrahydrocarbyl substituted ammonium, but preferably is tetra-lower alkyl substituted ammonium. All of the foregoing classes of bases are well-known and the above description is not limited solely to the ones described.

The reaction proceeds conveniently at temperatures between about 0° C. and 200° C. Preferably reflux temperatures are used with the solvent chosen to provide preferred reaction temperatures of between about 50° C. and 100° C. When the M moiety of the pyrazole of Formula II is other than hydrogen, the pyrazole acts as its own base making the presence of the bases described in the immediately preceding paragraph unnecessary. In this case, the reaction proceeds adequately at about 0° C. and higher temperatures are not necessary, although they can be used.

The reaction time is not critical, but generally lies between 1 and 72 hours. Preferably the reaction is continued until the mixture ceases to be basic. Pressure is not critical and the reaction can be conveniently carried out at atmospheric pressures, although super- or subatmospheric pressures can be employed.

The 1-allylpyrazole products are generally liquids and may be isolated by distillation.

STEP 2

The second step is carried out by treating the 1-allylpyrazole product of Step 1 with a halogen (chlorine, bromine or iodine) in an inert solvent at a temperature of from about —20° C. to about 100° C. Preferably the temperature is kept below 20° C. to avoid concurrent dehydrohalogenation. The step is conveniently carried out at atmospheric pressure although this is not a critical aspect of the step. The inert solvent is not critical and may be any inert solvent, as exemplified by hydrocarbons, both aromatic and aliphatic, such as benzene, toluene, xylene, hexane, cyclohexane, octane, etc.; and halogenated hydrocarbons such as carbon tetrachloride, methylene chloride, s-tetrachloroethane, 1,1,2-trichloro-1,2,2-trifluoroethane, and the like. The halogenated 1-allylpyrazole need not be isolated at this point, for quaternization will occur to yield a solid 1,2-(2-halo-trimethylene)pyrazolium halide simply by stripping the solvent off and heating the reaction product to a temperature of about 50° to 150° C. Quaternization will occur slowly at room temperature or below, however.

STEP 3

In the third step, the 3a,6a-diazapentalenes of Formula II are obtained by treating an aqueous or alcoholic solution of the 1,2-(2-halo-trimethylene)pyrazolium halide of Step 2 with at least two equivalents of an alkali metal or quaternary hydrocarbyl ammonium hydroxide or alkoxide, or an alkaline earth metal hydroxide at a temperature of between about —10° C. to about 70° C. Because the resulting products are reactive with oxygen, it is necessary to deoxygenate the solvent and to carry out the reaction in an inert atmosphere such as nitrogen, argon, helium, etc. Examples of bases employed include sodium hydroxide, potassium hydroxide, calcium hydroxide, barium hydroxide, tetramethylammonium hydroxide, tetraethylammonium hydroxide, benzyltrimethyl ammonium hydroxide, sodium ethoxide, potassium methoxide, tetramethyl ammonium ethoxide and the like. The alkoxide is preferably of 1–6 carbons and the quaternary ammonium cation is preferably lower alkyl substituted ammonium. The resulting product is isolated by conventional methods under an inert atmosphere, for example, by filtration or extraction with an organic solvent. Neither temperature nor pressure are critical and atmospheric conditions are most conveniently employed.

Compounds of the invention containing cyano, dicyanovinyl or tricyanovinyl substituents can be obtained from compounds of Formula II wherein one or more of Y, Y", Z and Z" are hydrogen. To substitute these groups, it is preferable, because of ease of handling, not to isolate the product of Step 3, but rather to extract it from the reaction mixture of Step 3 with a suitable solvent (such as an aromatic hydrocarbon or a halogenated hydrocarbon, as for example, benzene, toluene, chloroform, and the like). This extract can then be treated with cyanogen chloride at atmospheric conditions to obtain cyano substituted compounds, with tetracyanoethylene to obtain tricyanovinyl substituted compounds, and with 1,1-dicyano-2-chloroethylene to obtain dicyanovinyl substituted compounds. In these reactions, temperature and pressure are not critical and ordinary conditions are usually employed. The compounds can be isolated by conventional isolation procedures.

The following examples further illustrate the process and products of the invention.

A. THE PREPARATION OF 1-ALLYLPYRAZOLES

Example I.—1-allyl-4-bromopyrazole

A solution of 195 gm. (1.33 mole) of 4-bromopyrazole, 172 gm. (1.33 mole) of diisopropylethylamine and 170 gm. (1.40 mole) of allyl bromide was refluxed in 850 ml. of dry tetrahydrofuran for 3 days, after which time, the solution ceased to be basic. The mixture was cooled with stirring, one liter of ether added and the mixture filtered. The filtrates were combined, stripped of volatiles and the residual liquid distilled in vacuo. There was obtained 204 gm. (82%) of a colorless liquid, B.P. 43°/0.31 mm., $n_D^{20}$ 1.5272 which was identified as 1-allyl-4-bromopyrazole.

*Analysis.*—Calcd. for $C_6H_7N_2Br$: C, 38.5; H, 3.74; Br, 42.7. Found: C, 38.6; H, 4.09; Br, 42.0.

Example II.—1-allyl-3,5-dimethylpyrazole

This compound was prepared from 3,5-dimethylpyrazole and allyl bromide on a 2.9-mole scale by the method of Example I. It was obtained in 91.0% yield as a colorless liquid, B.P. 45°/0.45 mm., $n_D$ 1.4836, and identified as 1-allyl-3,5-dimethylpyrazole.

*Analysis.*—Calcd. for $C_8H_{12}N_2$: C, 70.6; H, 8.88; N, 20.6. Found: C, 70.5; H, 8.73; N, 20.5.

The literature values are B.P. 187-190°/atm., $n_D$ 1.4874 [I. I. Grandberg and A. N. Kost, Zhur. Obshchei Khim., 30, 2942 (1960)].

Example III.—1-allyl-3,4,5-trimethylpyrazole

This compound was prepared from 3,4,5-trimethylpyrazole and allyl bromide on a 1-molar scale by the method of Example I. It was obtained in 91.4% yield as a colorless liquid, B.P. 58°/0.4 mm., $n_D$ 1.4876, and identified as 1-allyl-3,4,5-trimethylpyrazole.

*Analysis.*—Calcd. for $C_9H_{14}N_2$: C, 72.0; H, 9.39; N, 18.6. Found: C, 72.0; H, 9.33; N, 18.6.

Example IV—1-allylpyrazole

One mole of potassium pyrazolide [prepared by the method of W. Hückel and H. Bretschneider, Ber., 70, 2024 (1937)] in tetrahydrofuran was refluxed with 1.1 mole of allyl bromide until the mixture ceased to be basic. It was filtered and the filtrate distilled. The product was obtained in 82% yield, B.P. 84°/62 mm., 162°/atm., $n_D$ 1.4847 [reported B.P. 159°, $n_D$ 1.4847; L. I. Finar and K. Utting, J. Chem. Soc., 1960, 5272].

*Analysis.*—Calcd. for $C_6H_8N_2$: N, 25.9. Found: N, 25.9.

The ultraviolet spectrum has $\lambda_{max}217\mu$, $\epsilon 5800$ and $\lambda_{max}249$, $\epsilon 9.7$.

Example V.—1-allyl-3,5-dimethyl-4-bromopyrazole

This compound was prepared from 3,5-dimethyl-4-bromopyrazole and allyl bromide on a 2.0 molar scale by the method of Example I. It was obtained in 67% yield as a colorless liquid, B.P. 77–84°/1, $n_D$ 1.5113, and identified as 1-allyl-3,5-dimethyl-4-bromopyrazole.

B. THE PREPARATION OF 1,2-(2-HALOTRIMETHYLENE)PYRAZOLIUM HALIDES

Example VI.—1,2-(2-bromotrimethylene)pyrazolium bromide 10.8 gm. (0.1 mole) of 1-allylpyrazole were stirred in 100 ml. of carbon tetrachloride at 5° and 16 gm. (0.1 mole) of bromine was added slowly. The mixture was stirred for 1 hour at 5–10°. A solid formed and it was filtered and washed with hexane. There was obtained 0.4 g. of colorless crystals.

The N.M.R. spectrum of this material in $D_2O$ had a doublet at 1.65τ, a triplet at 3.02τ, a quintet at 4.52τ and a doublet at 5.32τ with relative intensities 2:1:1:4, respectively. These peaks correspond respectively to protons *b*, *a*, *d*, and *c*.

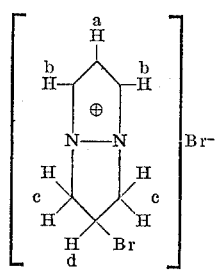

This identified the product as 1,2-(2-bromotrimethylene)-pyrazolium bromide.

Example VII.—1,2-(2-bromotrimethylene)pyrazolium bromide (A) and 1,2-(2-bromo-trimethylene)-4-bromopyrazolium bromide (B)

Half a mole of 1-allylpyrazole was dissolved in 500 ml. of carbon tetrachloride and stirred at 0–5°. A solution of 80 gm. (0.5 mole) of bromine in 500 ml. of carbon tetrachloride was added slowly to the first solution. The resulting solution was decanted from a residue, the solvent stripped away and the residue heated on a steam bath until it was largely solidified. The solid was filtered, washed with ether and recrystallized from absolute alcohol. The first product that precipitated was predominantly B (about 9:1 ratio of B:A). The filtrate was mixed with a large excess of ether which precipitated Compound A (by N.M.R., a 92:8 mixture of A and B). The yield of A was 23.5 g. and that of B 2.4 g. From the mother liquors another 3.0 g. of crude A was obtained.

*Analysis.*—(A) Calcd. for $C_6H_8Br_2N_2$: C, 26.9; H, 2.99; Br, 59.8; N, 10.4. Found: C, 26.8; H, 2.81; Br, 60.1; N, 9.63.

*Analysis.*—(B) Calcd. for $C_6H_7Br_3N_2$: C, 20.8; H, 2.08; Br, 69.2; N, 8.07. Found: C, 21.1; H, 2.23; Br, 69.1; N, 7.89.

The ultraviolet spectrum had $\lambda_{max}244\mu$, $\epsilon$ 3130.

The N.M.R. spectrum of A was as described in Example VI; that of B consists of a singlet at 1.16τ, a multiplet at 4.30τ and a doublet at 4.65τ (J=2.8) with relative areas 2:1:4, respectively. The data were consistent for the above-named products.

When an aqueous solution of A was treated with base (NaOH or warm $K_2CO_3$) an intense yellow color was produced which was extractable into $CH_2Cl_2$. On standing exposed to air the product darkened.

Example VIII.—1,2-(2-bromotrimethylene)-4-bromopyrazolium bromide 1-allyl-4-bromopyrazole (202 gm. 1.08 mole) was dissolved in 1700 ml. of carbon tetrachloride and 180 gm. (1.12 mole) of bromine was added slowly without external cooling. The solution was decanted from a small amount of gummy material and stripped of volatiles. The residual oil was heated on a steam bath for two days. The resulting solid was recrystallized from one l. of water (the color being removed with Darco) and was washed successively with water, ethanol, and ether. The first crop weighed 196 gm. (52.5%). By concentration of the filtrate further crops of 69.0 gm. and 10.1 gm. (18.4% and 2.7%) were obtained. The final filtrate was evaporated to dryness and triturated with hot methanol, yielding another 23.0 gm. (6.1%) of less pure product for a total yield of 79.7%.

The product was identical in all respects (M.P., infrared and N.M.R. spectra) with Compound B from Example VII.

Example IX.—1,2-(2-bromotrimethylene)-3,4,5-trimethylpyrazolium bromide 1-allyl-3,4,5-trimethylpyrazole was dissolved in carbon tetrachloride and treated with an equimolar amount of bromine. The solution, after decantation, was stripped of volatiles on a steam bath. The residual oil was heated on the steam bath until it partly solidified. The solid was dissolved in ethanol and the solution stirred with Darco and filtered. Ether was added to the filtrate causing the separation of a solid. The N.M.R. of this solid was in accord with structure

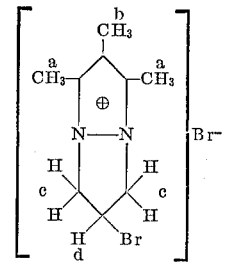

having a multiplet at 4.50τ, a doublet at 5.07τ, and singlets at 7.58 and 7.91τ with relative areas 1:4:6:3, corresponding to hydrogens *d*, *c*, *a*, and *b*, respectively, identifying the above product.

Example X.—1,2-(2-bromotrimethylene)-3,5-dimethyl-4-bromopyrazolium bromide

To 136 gm. (1 mole) of 1-allyl-3,5-dimethylpyrazole stirred at 10–15° in 800 ml. $CCl_4$, was added dropwise 160 gm. (1 mole) of bromine. The solution was decanted from a heavy oil and was stripped of volatiles on a steam bath. The semisolid residue was triturated with chloroform and filtered. The solid was purified by recrystallization from water for a yield of 28 g. (7.5%).

*Analysis.*—Calcd. for $C_8H_{11}Br_3N_2$: C, 25.6; H, 2.94; Br, 64.1. Found: C, 25.8; H, 2.94; Br, 63.7.

The N.M.R. spectrum was confirmatory with a quintuplet at $4.42\tau$ ($J=3$), doublet at $3.90\tau$ ($J=3$) and singlet at $7.45\tau$ with relative areas of 1:4:6, respectively, corresponding to the 2-methylene proton, 1,3-methylenes and 3,5-methyls, thus identifying the above product.

C. THE PREPARATION OF 3a,6a-DIAZAPENTALENES

Example XI.—3a,6a-diazapentalene

An aqueous solution of 1,2-(2-bromotrimethylene) pyrazolium bromide was treated with an excess of 25% sodium hydroxide solution. The reaction mixture was rapidly extracted with chloroform-d and the N.M.R. spectrum of this solution taken.

The spectrum consisted of a doublet at $2.99\tau$ and a triplet at $3.35\tau$ ($J=2.5$ cps.) with relative areas of 2:1, in accord with the 3a,6a-diazapentalene structure.

Example XII.—3a,6a-diazapentalene

In a nitrogen tent, 10 ml. of 0.5 M solution of 1,2-(2-bromotrimethylene)-pyrazolium bromide was added to 20 ml. of 25% sodium hydroxide. Small portions of the resulting solid product were sublimed in a tube at 70°/1 mm. to yield white crystals. The crystals were mulled with Nujol (under nitrogen) for taking the infrared spectrum which consisted of bands at 3160 (strong), 1430, 1400, 1139 (strong), 1040, and 929 (strong) cm.$^{-1}$. On exposure to air the crystals became black.

Because of air-sensitivity, the 3a,6a-diazapentalene was analyzed by mass spectrography, being injected directly into the ionizing chamber. The structure was confirmed by the presence of a strong parent peak at 106 m/e.

Example XIII.—2-bromo-3a,6a-diazapentalene

An aqueous solution of 1,2-(2-bromotrimethylene)-4-bromopyrazolium bromide was poured into excess 25% sodium hydroxide and the resulting solid was quickly pressed dry and sublimed at 80°/1 mm. A white, crystalline sublimate was obtained. It was less air sensitive than 3a,6a-diazapentalene. It had no well-defined M.P. but darkened gradually on being heated in a capillary tube.

The N.M.R. spectrum was confirmatory with a two-peak system of 4 hydrogens at 2.85 and $2.92\tau$ in 3:1 ratio, resulting from overlap of the 1,3-proton singlet with the 4,6-proton doublet, and a triplet corresponding to the 5-proton ($J=2.5$).

The analysis was carried out by mass spectrometry. The 2-bromo-3a,6a-diazapentalene structure was confirmed by the presence of strong 184 m/e and 186 m/e parent isotope ions.

Example XIV.—1,2,3-trimethyl-3a,6a-diazapentalene

An aqueous solution of 1,2-(2-bromotrimethylene)-3,4,5-trimethylpyrazolium bromide was mixed with 25% sodium hydroxide solution and quickly extracted with chloroform-d. The extract was scanned immediately by N.M.R. It exhibited two singlets in 2:1 ratio at 7:55 and $7.77\tau$ thus being in accord with structure

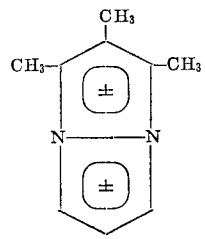

The concentration was too low for detecting the other H atoms.

When the above reaction was repeated without extracting the product, dark oily globules formed which solidified on standing. The compound was distilled in vacuo, yielding a colorless oil which solidified on cooling. Upon exposure to air it immediately turned violet. On treatment with tetracyanoethylene, it gave a purple dye which dyed a variety of fibers.

Example XV.—3a,6a-diazapentalene-1,3-dicarbonitrile 100 ml. of a 0.5 M solution of 1,2-(2-bromotrimethylene)-pyrazolium bromide was added to a nitrogen-flushed separatory funnel containing 150 ml. chloroform and 150 ml. 25% sodium hydroxide solution. The 3a,6a-diazapentalene was quickly extracted into the chloroform, which was separated and poured into 150 ml. of chloroform containing about 5 ml. of cyanogen chloride. The original aqueous phase was extracted once more with 150 ml. of chloroform and the extracts added to the cyanogen chloride solution. The combined chloroform extract was stirred with anhydrous magnesium sulfate and "Darco," and was filtered. The solid filter cake was fashed thoroughly with chloroform and the entire filtrate stripped of volatiles, yielding 1.3 g. of a dark reddish-brown residual solid which was purified by sublimation at 220°/mm. A white crystalline sublimate was obtained which darkened in air, sintered around 226° and slowly decomposed at higher temperatures.

*Analysis.*—Calcd. for $C_8H_4N_4$: C, 61.5; H, 2.58; N, 35.9; Mol. Wt. 156. Found: C, 61.7; H, 2.73; N, 35.8, 36.0; Mol. Wt. (by osmometry in chloroform) 163.

The infrared spectrum showed a very strong conjugated nitrile band at 2210 cm.$^{-1}$.

Example XVI.—1,3-dimethyl-2-bromo-3a,6a-diazapentalene-4,6-dicarbonitrile

Twenty grams (0.053 mole) of 1,2-(2-bromotrimethylene)-3,5-dimethyl-4-bromopyrazolium bromide were dissolved in 150 ml. of water. This solution was placed along with 250 ml. chloroform, into a 1-liter separatory funnel blanketed with nitrogen. One hundred ml. of 25% sodium hydroxide was added, and the 1,3-dimethyl-2-bromo-3a,6a-diazapentalene was quickly extracted into the chloroform layer and the layer promptly poured in a chloroform solution of 10 ml. of cyanogen chloride. The resulting dark mixture was filtered and the filtrate stripped of volatiles. The residue was stirred with chloroform and filtered yielding a total of 3.6 g. (25%) of light tan needles which darkened when heated in air and showed decomposition around 260°. The compound was purified by recrystallization from toluene and sublimation in vacuo.

*Analysis.*—Calcd. for $C_{10}H_7BrN_4$: C, 45.7; H, 2.66; N, 21.3. Found: C, 45.7; H, 2.88; N, 20.6.

The N.M.R. spectrum was confirmatory with two singlets at 2.58 and $7.30\tau$ (intensity ratio 1:6) corresponding to the 5-hydrogen and the 1,3-methyl hydrogens, respectively. The infrared spectrum had a very strong conjugated nitrile band at 2220 cm.$^{-1}$.

Example XVII.—Tricyanovinyl dye from 3a,6a-diazapentalene

A benzene solution of tetracyanoethylene was placed on top of a 25% aqueous sodium hydroxide solution. An aqueous solution of 1,2-(2-bromotrimethylene)pyrazolium bromide was added slowly to this two-phase system. As 3a,6a-diazapentalene was formed, it migrated into the benzene layer and reacted with tetracyanoethylene forming an intense red dye. The benzene layer was evaporated yielding dark red (almost black) crystals.

The infrared spectrum of the product had strong CN bands at 2220 and 2150 cm.$^{-1}$, which is characteristic of tricyanovinyl compounds.

The product was dissolved in ethanol, and a multicloth patch was boiled briefly in this solution and then allowed to soak at room temperature for two hours. The cloth patch was washed with water, then with hot dilute detergent solution and was allowed to dry. Various shades of red were obtained. The dye adhered particularly well to wool, silk, "Zefran," nylon, "Arnel" and cellulose acetate components of the patch.

Example XVIII.—Tricyanovinyl dye from 1,2,3-trimethyl-3a,6a-diazapentalene

A small sample of 1,2,3-trimethyl-3a,6a-diazapentalene from Example XIV gave a red dye on treatment with tetracyanoethylene. A cloth was dyed with it as in Example XVII.

Example XIX.—Dicyanovinyl dye from 3a,6a-diazapentalene

Twenty-five ml. of a 0.5 M solution of 1,2-(2-bromotrimethylene)pyrazolium bromide were added under nitrogen, to 100 ml. of 25% NaOH covered with 200 ml. of benzene. The 3a,6a-diazapentalene was extracted into benzene and the benzene extract added, all at once, to a solution of 3 ml. 1,1-dicyano-2-chloroethylene. The reaction mixture was dried with MgSO₄ and filtered. On stripping the filtrate of volatiles there was obtained 60 mg. of a dark solid. It had a strong CN band at 2240 cm.$^{-1}$.

Some of the solid was dissolved in ethanol and small pieces of cloth dyed with it as in Example XVII. The dye was adsorbed particularly well by cellulose acetate and "Arnel," giving rich purplish shades of red.

When any pyrazole of Formula III is treated with any allyl halide of Formula IV by the methods of Examples I, VIII and VII, respectively, the resulting 3a,6a-diazapentalene will be obtained. To further exemplify the processes and products of the invention, the following table sets forth a list of some pyrazoles, any of which can be treated with an allyl halide from the second list to produce 3a,6a-diazapentalenes of the invention.

Pyrazoles:
    3-methylpyrazole
    4-methylpyrazole
    3,4-dimethylpyrazole
    3-ethylpyrazole
    3-methoxypyrazole
    3-methyl-5-chloropyrazole
    4-methylpyrazole
    3-methyl-4-chloropyrazole
    3,4,5-trimethylpyrazole
    4-chloropyrazole
    4-iodopyrazole
    3-bromo-4-ethylpyrazole
    5-chloro-3-methylpyrazole
    3,4-dibromopyrazole
    3-methoxy-5-methylpyrazole
    3-pyrazolecarboxaldehyde
    3-benzoylpyrazole Allyl halides:
    Methallyl chloride
    2,3-dibromopropene
    Cinnamyl bromide
    1,4-dibromo-2-butene
    1-bromo-5,5-dimethyl-2-hexene
    1,6-dibromo-2-hexene
    4-bromo-2-pentene The pyrazoles of Formula III which can be employed in the process of this invention are, in general, listed in E. H. Rodd's "Chemistry of Carbon Compounds," vol. IV, Part A, pp. 251ff, and can be prepared by known methods.

The allyl halides of Formula IV which can be employed are either commercially available or are reported in the literature. Literature sources which may be used to prepare these reactants include A. A. Petrov et al., Zhur, Obshchei Khim., 26, 1113 (1956); L. Combre et al., J. Chem. Soc., 126 (1956) and A. N. Pudovik et al., Zhur. Obshchei. Khim., 25, 589 (1955).

Because of availability and ease of handling, the R–R⁵ groups in Formula I are preferably hydrogen or halogen, where applicable; and because of dyeability the R–R⁵ group, dicyanovinyl and tricyanovinyl, where applicable, are also preferred.

All of the compounds of this invention react with oxygen to give dark colored products. This makes them valuable in applications involving the detection of oxygen, i.e., in testing for oxygen contamination of inert gases or in leak detection in vacuum systems. In addition, the dicyanovinyl and tricyanovinyl substituted compounds are dyes of high tinctorial strength which readily dye wool, silk and a variety of synthetic fibers.

As many apparently widely different embodiments of this invention may be made without departing from the spirit and scope thereof, it is to be understood that this invention is not limited to the specific embodiments thereof except as defined in the appended claims.

The embodiments of the invention in which the exclusive property or privilege is claimed are defined as follows:

1. 3a,6a, diazapentalene of the formula

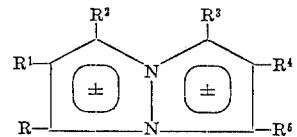

wherein
    R is selected from the class consisting of hydrogen, halogen, alkyl of 1–6 carbon atoms, alkoxy of 1–6 carbon atoms, formyl, cyano, dicyanovinyl and tricyanovinyl; $R^1$ is selected from the class consisting of hydrogen, halogen, and alkyl of 1–6 carbon atoms; $R^2$ is selected from the class consisting of hydrogen, halogen, alkyl of 1–6 carbon atoms, cyano, dicyanovinyl and tricyanovinyl; $R^3$ is selected from the class consisting of hydrogen, alkyl of 1–6 carbon atoms, cyano, dicyanovinyl and tricyanovinyl; $R^4$ is selected from the class consisting of hydrogen, halogen, and alkyl of 1–6 carbon atoms; $R^5$ is selected from the class consisting of hydrogen, alkyl of 1–6 carbon atoms, haloalkyl of 1–6 carbon atoms, cyano, dicyanovinyl and tricyanovinyl; provided that the groups cyano, dicyanovinyl and tricyanovinyl are substituted on only one of the two rings of the diazapentalene.

2. 3a,6a-diazapentalene.
3. 2-bromo-3a,6a,diazapentalene.
4. 1,2,3-trimethyl-3a,6a-diazapentalene.
5. 3a,6a-diazapentalene-1,3-dicarbonitrile.
6. Process for preparing a compound of the formula

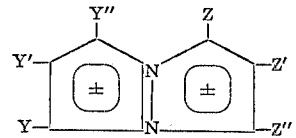

wherein Y is selected from the class consisting of hydrogen, halogen, alkyl of 1–6 carbon atoms, alkoxy of 1–6 carbon atoms and formyl; Y', Y'' and Z' are each selected from the class consisting of hydrogen, halogen, and alkyl of 1–6 carbon atoms; Z is selected from the class consisting of hydrogen and alkyl of 1–6 carbon atoms; and Z'' is selected from the class consisting of hydrogen, alkyl of 1–6 carbon atoms, and haloalkyl of 1–6 carbon atoms, which comprises:

(a) reacting a compound of the formula

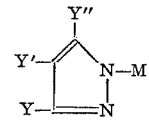

wherein Y, Y', and Y'' are defined as above and M is selected from the class consisting of hydrogen, alkali metal, tertiary hydrocarbyl substituted ammonium, and quaternary hydrocarbyl substituted ammonium, with an allyl halide of the formula

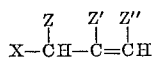

wherein Z, Z' and Z'' are defined as above and X is halogen, in a basic medium at a temperature between 0° C. and 200° C. until the mixture ceases to be basic and a 1-allylpyrazole obtained,
(b) treating the 1-allylpyrazole with a halogen in an inert solvent at a temperature of from −20° C. to 100° C. to obtain a 1,2-(2-halotrimethylene)pyrazolium halide, and
(c) treating said pyrazolium halide with at least two equivalents of a compound selected from the class consisting of alkali metal hydroxide quaternary hydrocarbyl substituted ammonium hydroxide, alkali metal alkoxide, quaternary hydrocarbyl substituted ammonium alkoxide and alkaline earth metal hydroxide in a deoxygenated solvent selected from the class consisting of water and alcohol at a temperature of between −10° C. and 70° C. in an inert atmosphere.

7. Process for preparing a compound of the formula

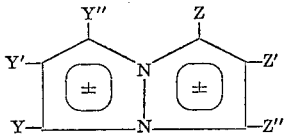

wherein Y is selected from the class consisting of hydrogen, halogen, alkyl of 1–6 carbon atoms, alkoxy of 1–6 carbon atoms and formyl; Y', Y'' and Z' are each selected from the class consisting of hydrogen, halogen, and alkyl of 1–6 carbon atoms; Z is selected from the class consisting of hydrogen and alkyl of 1–6 carbon atoms; and Z'' is selected from the class consisting of hydrogen, alkyl of 1–6 carbon atoms, and haloalkyl of 1–6 carbon atoms, which comprises treating a compound of the formula

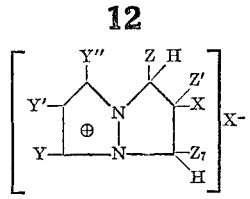

wherein Y, Y', Y'', Z, Z', Z'' are defined above and X is halogen, with at least two equivalents of a compound selected from the class consisting of alkali metal hydroxide, quaternary lower alkyl substituted ammonium hydroxide, alkali metal alkoxide, quaternary lower alkyl substituted ammonium alkoxide, said alkoxides having from 1 to 6 carbon atoms, and alkaline earth metal hydroxide in a deoxygenated solvent selected from the class consisting of water and alcohol at a temperature of between −10° C. and 70° C. in an inert atmosphere.

References Cited

UNITED STATES PATENTS

| | | |
|---|---|---|
| 2,553,404 | 5/1951 | Dixon. |
| 2,553,405 | 5/1951 | Dixon. |
| 2,584,409 | 2/1952 | Wystrach. |
| 2,889,335 | 6/1959 | Heckert. |
| 3,262,944 | 7/1966 | Harder et al. |

OTHER REFERENCES

Fieser et al.: Organic Chemistry, 2nd ed., pp. 59–60, New York, Reinhold, 1950.
Häring et al.: Helv. Chim. Acta., vol. 40, pp. 852–63.
Solomons et al.: I. Chem. Industry, 1963, pp. 1462–3.
Solomons et al.: II. Journ. Amer. Chem. Soc., vol. 87, pp. 528–31.
Wagner et al.: Synthetic Organic Chemistry, pp. 35–8, New York, Wiley, 1953.

NORMA S. MILESTONE, *Primary Examiner.*
NATALIE TROUSOF, *Assistant Examiner.*

U.S. Cl. X.R.

8—54, 55, 57; 252—408; 260—240

UNITED STATES PATENT OFFICE
CERTIFICATE OF CORRECTION

Patent No. 3,431,275      Dated March 4, 1969

Inventor(s) Swiatoslaw Trofimenko

It is certified that error appears in the above-identified patent and that said Letters Patent are hereby corrected as shown below:

Col. 2, Step 2, between lines 30 and 55, the equation should end with:  ; line 11, the second "of" should be changed to -- or --;

Col. 3, line 73, there should be a " - " at the end of the line;

Col. 8, line 17, "fashed" should be -- washed --;

Col. 10, lines 50-55, the central portion of the formula should be  ; and Col. 12, top 8 lines, the "$Z_7$" should be -- Z' --.

Signed and sealed this 16th day of May 1972.

(SEAL)
Attest:

EDWARD M. FLETCHER, JR.
Attesting Officer

ROBERT GOTTSCHALK
Commissioner of Patents